United States Patent [19]

Nadherny et al.

[11] Patent Number: 5,662,295
[45] Date of Patent: Sep. 2, 1997

[54] CABLE BIGHT WEAR GUARD ASSEMBLY

[75] Inventors: Rudolph E. Nadherny, Golden, Mo.; Stephen H. Beals, Libertyville, Ill.

[73] Assignee: Ireco, Inc., Chicago, Ill.

[21] Appl. No.: 576,789

[22] Filed: Dec. 21, 1995

[51] Int. Cl.$^6$ .................................................. E21F 17/02
[52] U.S. Cl. .......................................................... 248/58
[58] Field of Search ................... 248/58, 55, 925, 248/332, 323

[56] References Cited

U.S. PATENT DOCUMENTS

| | | | |
|---|---|---|---|
| 2,291,148 | 7/1942 | Carson | 248/58 |
| 4,519,564 | 5/1985 | Nadherny | 248/58 |
| 4,886,404 | 12/1989 | Jensen et al. | 248/58 X |
| 5,474,274 | 12/1995 | Bernosky | 248/58 X |

Primary Examiner—Ramon O. Ramirez
Attorney, Agent, or Firm—Lockwood, Alex, FitzGibbon & Cummings

[57] ABSTRACT

A cable wear guard for shielding a bight in a support cable from direct rubbing contact with the surface in an aperture such as the aperture in the flange on the underside of a rail car coupler or the aperture on the flange on a glad hand. The cable wear guard is particularly useful with the adjustable support assembly disclosed in U.S. Pat. No. 4,519,564 dated May 28, 1985. The cable wear guard for the bight in a cable passing through an aperture in the flange on a car coupler is generally U-shaped and formed of at least relatively rigid material. Preferably, the cable wear guard has an outwardly facing groove in which the cable bight is secured with a slippage fit so as to allow for adjustment for differences in the initial lengths of the opposing sides of a bight. The wear guard for a cable bight passing through the aperture in the flange on a glad hand is likewise U-shaped but provision for cable slippage therein may not be necessary.

15 Claims, 2 Drawing Sheets

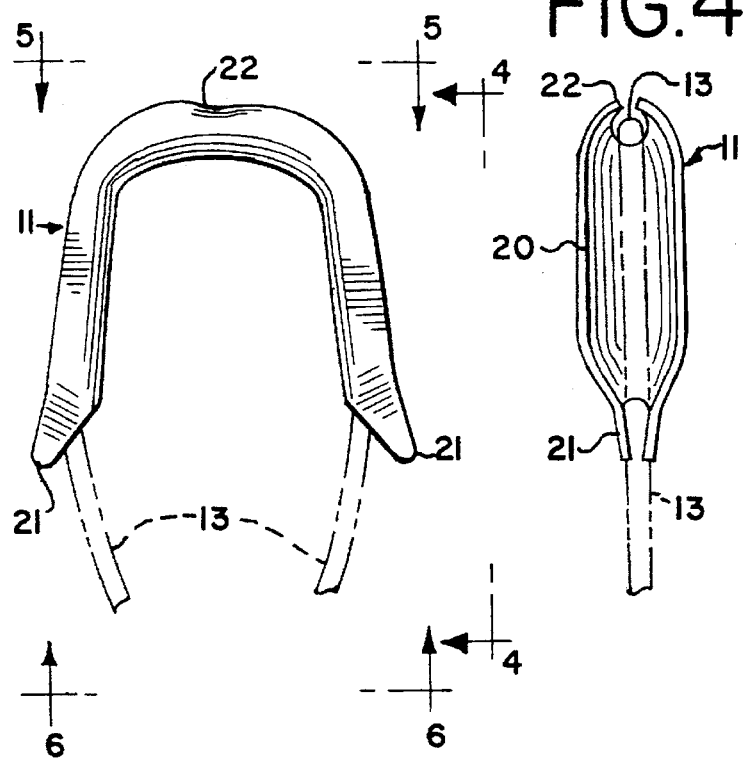
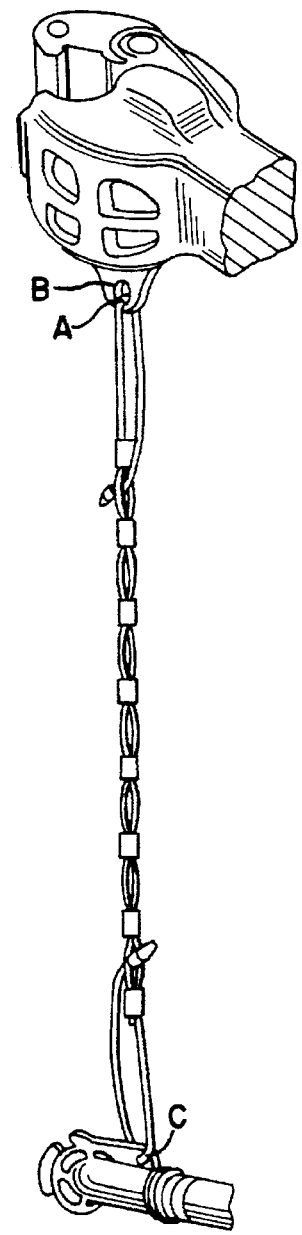
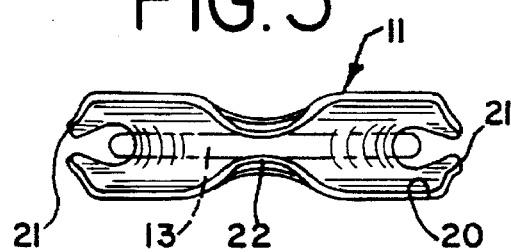
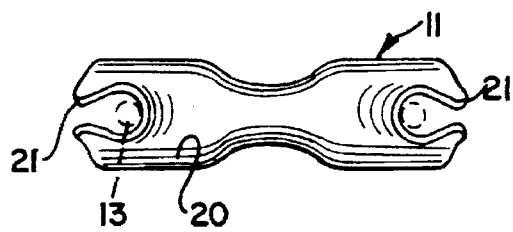

CABLE BIGHT WEAR GUARD ASSEMBLY

SPECIFICATION

BACKGROUND AND DESCRIPTION OF THE INVENTION

This invention relates, generally, to improvements and innovations in wear guards or thimble for shielding the bights in cables from direct rubbing contact with wear surfaces which cause the cable material to fray and ultimately break if not replaced. More particularly, the invention relates to cable wear guards and their use to protect the bights in cables passing through apertures in railway car couplers, the cables forming parts of flexible elongated supports for supporting the glad hands on the ends of the air brake hoses.

There is disclosed in Nadherny U.S. Pat. No. 4,519,564 dated May 28, 1985, assigned to Ireco, Inc. the assignee of the present invention, an adjustable support assembly which has multiple uses, one of which is to support the glad hands on air brake hoses of railway cars from the railway car couplers. Insofar as it is pertinent to the present invention, the disclosure of U.S. Pat. No. 4,519,564 is hereby incorporated herein by reference.

In FIGS. 1 and 9 of U.S. Pat. No. 4,519,564, the glad hands on the ends of air brake hoses are shown being supported from apertured brackets on railway car couplers, with cables forming parts of the supports and passing directly through the apertures in the brackets on the couplers. It has been found in practice that the more or less constant rubbing action of the bights in the cables against the bracket apertures due to relative movement between the glad hands and the car couplers when trains are in motion, and the considerable strain suddenly imposed on the bights when cars are uncoupled and the glad hands are jerked apart, causes the individual strands of the cables to wear through and break so that the bights in the cables become frayed and the supports for the glad hands will fail if not replaced in time. Excessive wear may also occur at the bights in cables that pass through apertures in the brackets on the glad hands as a result of the rubbing which occurs between these bights in the cables and the aperture surfaces.

In accordance with the present invention, it has been found that the useful lives of the adjustable support assemblies disclosed in U.S. Pat. No. 4,519,564 can be greatly extended by using cable wear guards or thimbles to shield the bights in cables which have previously had direct rubbing contact with the surfaces of the apertures in the brackets on the underside of railway couplers. These wear guards are of such design and construction as to allow the bight portions of the cables to freely slip within the wear guards. However, in use, the rubbing action occurs primarily between the surfaces of the wear guards and the surfaces of the apertures with a minimal amount of rubbing or slipping action occurring between the bights in the cable and the wear guards themselves.

The wear guards of the present invention are inexpensive and conveniently placed on the cables and inserted through the apertures in the brackets which depend from the undersides of the railway car couplers as well as through the apertures in the brackets on the tops of glad hands.

Accordingly, the primary object of the invention, generally stated, is the provision of cable wear guards for combined use with the supports for glad hands on air brake hoses from railway car couplers, which cable wear guards are inexpensive to produce and assemble on the cables and which serve to shield the bights in the cables from wearing engagement against the surfaces of the apertures in the couplers and glad hand support brackets and as a result, greatly extend the lives of the cables and the supports of which the cables form a part.

For a more complete understanding of the nature and scope of the invention, reference may be had to the following description of preferred embodiments of the invention taken in connection with the accompanying drawings, wherein:

BRIEF DESCRIPTION OF THE DRAWINGS

FIG. 3 is a side elevational view of the upper cable wear guard shown in FIGS. 1 and 2 for the car coupler;

FIG. 4 is a side view taken on line 4—4 of FIG. 3;

FIG. 5 is a top plan view taken on line 5—5 of FIG. 3;

FIG. 6 is a bottom plan view taken on line 6—6 of FIG. 3;

FIG. 8 is a perspective view corresponding to FIG. 1 of U.S. Pat. No. 4,519,564 illustrating the prior art.

Referring to FIG. 1, a glad hand indicated generally at 5 on the end of an air brake hose 6 is shown being supported from a rail car coupler indicated generally at 7. The coupler 7 has a depending flange or bracket 8 which has a transverse aperture 10 in which is located a cable wear guard or thimble of the present invention indicated generally at 11.

Figure 1:
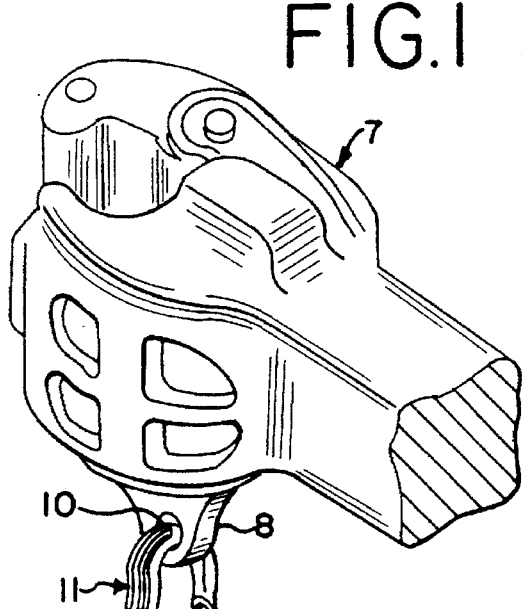
FIG. 1 is a perspective view of a glad hand on a rail car air brake hose being supported from a bracket on the underside of a car coupler with a cable wear guard of the present invention in place on the bight of a cable passing through the aperture in the depending bracket and showing a somewhat different wear guard in place on the bight of the cable passing through the aperture in the glad hand support bracket.

The glad hand 5 is supported from the coupler 7 by an elongated flexible support indicated generally at 12 which may correspond to the adjustable support assembly shown in FIG. 8 and indicated generally at 11 in FIG. 1 of U.S. Pat. No. 4,519,564. The upper end of the support 12 (FIG. 1) is in the form of a cable 13 which is usually, but not necessarily, formed of woven wire construction. As described in U.S. Pat. No. 4,519,564, the support 12 includes a series of "wedging elongated eyes" 14—14 formed by securing two lengths of cable together at spaced points. The free length of cable 13 at the upper end of the support 12 as well as a similar free length of cable 15 at its lower end each has a bullet shaped member 16 and 17, respectively, swaged on the end of the cable. As described in U.S. Pat. No. 4,519,564, on installation, the bullet shaped members 16 and 17 are forced through spreadable eyes 14. Once the end pieces 16 and 17 have been pushed all the way through the eyes 14 they will remain in place.

Referring to FIG. 8, (prior art) it will be seen that the upper length of cable that passes through the aperture in the flange or bracket depending from the car coupler has a bight portion A which rubs on the bottom surface of the aperture B due both to the normal swaying action of the air brake hose and glad hand during train movement and the jerking action which occurs when connected cars are uncoupled and the glad hands are jerked apart. Similarly, the cable on the lower end of the support has a bight portion C where the cable passes through an aperture in the flange or bracket on the glad hand.

For a description of the cable wear guard or thimble 11, reference may be had to FIGS. 1 and 3–6. As will be noted from FIGS. 1 and 3, the cable wear guard 11 is generally U-shaped, and when assembled as shown in FIG. 1, it will be in its inverted or downwardly oriented position. The cable guard 11 may be formed from crimpable metal, or from a suitable plastic which will be durable over long periods of use under the extreme weather conditions to which railway cars are exposed. For example, the cable wear guard 11 may be suitably stamped from malleable steel which is preferably galvanized or otherwise surface-protected.

The cable wear guard 11 is formed so that it has an outwardly facing groove 20 extending from end to end in which the cable 13 fits and is free to slip. At their distal ends, the legs of the U-shaped cable wear guard 11 are bifurcated as indicated at 21—21. The resulting ends are crimped together so as to trap and retain the cable 13 within the opposing ends of the groove 20. Preferably, at one location intermediate the distal ends, preferably at the bight portion of the thimble 11, the outer edges of the groove are crimped together as indicated at 22 so as to close the groove 20 and thereby retain the cable in place in the bight of the guard 11.

Slippage between the cable 13 and the cable wear guard 11 is allowed and provided for so as to compensate for initial differences in lengths of the opposite sides of the loop in the cable 13. However, once this adjustment for length slippage has occurred, there will be little or no appreciable additional slippage between the cable and the wear guard and thereafter the rubbing action will all take place between the inside of the bight portion of the cable wear guard 11 and the surface of the aperture 10.

While the bight portion of the lower length of cable 15 is also subjected to wearing action, it is usually sufficient to provide this bight with a crimped on wear guard 25 which does not need to allow for relative slippage between bight on the cable 15 and the wear guard 25.

Figure 2:
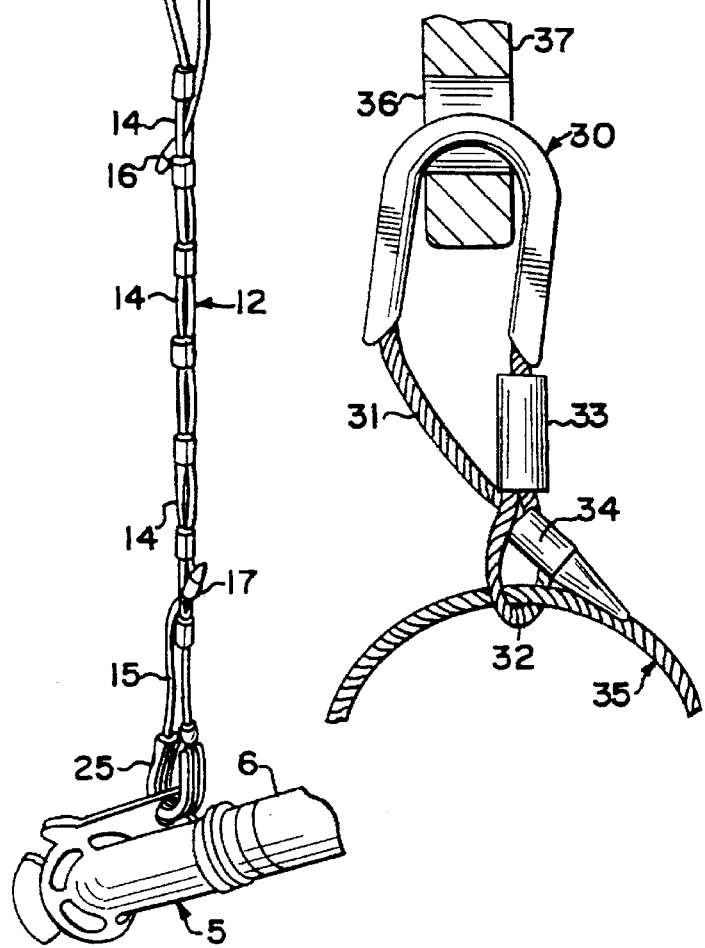
FIG. 2 is a fragmentary perspective view showing a second embodiment of the invention.

In FIG. 2, an embodiment of the invention is shown wherein a cable wear guard 30 is provided on the bight portion of a short length of cable 31, one end of which is bent over on itself so as to form a loop 32 maintained by a crimped on collar 33 while the opposite end is provided with a bullet shaped end member 34 which is inserted through the loop 32 as shown. A glad hand support such as the support 12 in FIG. 1 may be supported by the cable 31 bypassing the bight on cable 35 through the loop 32 as shown. The cable wear guard 30 may correspond to the cable wear guard 11 and is shown passing through an aperture 36 in a bracket 37 on the other side of a car coupler.

Figure 7:
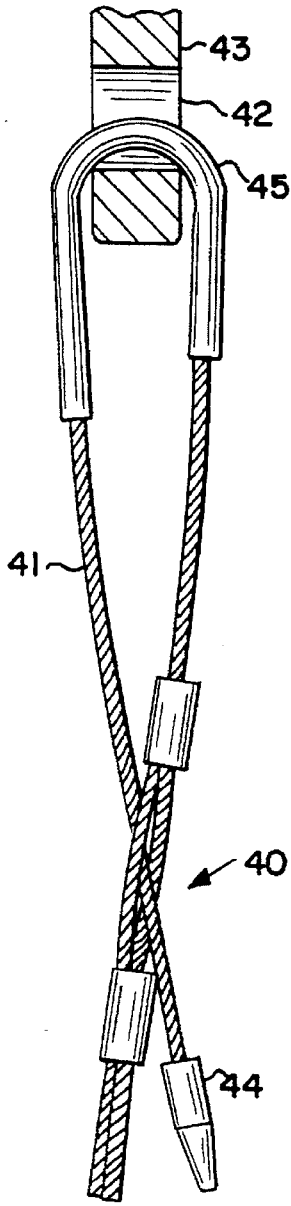
FIG. 7 is a fragmentary perspective view showing a third embodiment.

A third embodiment of the invention is shown in FIG. 7 wherein the upper end of an elongated flexible support is indicated generally at 40 corresponding to the elongated flexible support 12 in FIG. 1. The bight of free end 41 of the support 40 is shown passing through the aperture 42 in a coupler bracket 43. Prior to the swaging of the bullet shaped end member 44 on the cable free end 41, the cable is threaded through a thimble or wear guard in the form of U-shaped tube 45 the bight portion of which engages the bottom of the aperture 42. The tube 45 may be formed of a wear-resistant, weather-proof plastic with an inside diameter which allows the cable 41 to slip freely therein so that the lengths of the opposite sides of the loop in the free end are allowed to become equalized.

It will be apparent to those skilled in this art that the invention can be embodied in other forms. Accordingly, this invention is to be construed and limited only by the scope of the appended claims.

What is claimed is:

1. In combination, a cable wear guard and an elongated flexible support, said combination being for use in supporting a glad hand on a rail car from the aperture bracket depending from the coupler on the rail car, said elongated flexible support comprising a plurality of inelastic, flexible and stiff cables and a plurality of retaining members spaced along and rigidly secured to said stiff cables, said cables and said retaining members forming, in combination, a series of stiff elongated eyes, said stiff cables of the elongated eyes being sufficiently resilient in their generally transverse dimension such that said elongated eyes will expand and snap back to a generally closed position, said stiff cables of the elongated eyes being biased toward a generally closed orientation to provide a wedging portion at which at least a section of each of said stiff cables is substantially juxtaposed with respect to the other, at least one of said inelastic, flexible and stiff cables extends beyond an endmost retaining member, said at least one cable having a free end, said free end includes one-way means, said one-way means having a leading end and a trailing end, each said elongated eye and its wedging portion being sized and structured to permit passage of said one-way means through said elongated eye, said trailing end of the one-way means having an integral stop that is sized to provide a rigid abutment between said elongated eye and said trailing end of the one-way means, and said abutment restrains passage of the one-way means in a direction toward said abutment between the elongated eye and the integral stop, said one-way means being insertable through the aperture in said apertured bracket prior to being inserted through the elongated eye adjacent said endmost retaining member so that said free end will form a loop at the end of said elongated flexible support with said loop having a bight where it passes through said aperture; and said cable wear guard being generally U-shaped, formed of a wear-resistant material, fitting on said bight in said free end, and being insertable through said aperture whereby the bight of said wear guard will have direct contact with the interior of said aperture thereby shielding said free end from direct contact with said interior surface.

2. In the combination of claim 1, said wear guard fitting freely on said bight in said free end so that said bight is slippable in said wear guard allowing opposite sides of said loop to equalize.

3. In the combination of claim 2, said wear guard being formed of a relatively rigid material and having an outwardly facing groove extending substantially from end-to-end into which said free end is received, said groove being sufficiently closed adjacent its opposite ends whereby said bight in said free end will be retained in said groove.

4. In the combination of claim 3, said groove being sufficiently closed at at least one location intermediate its opposite ends so as to retain said bight in said groove at each said intermediate location.

5. In the combination of claim 4, said intermediate location is approximately mid-way between said opposite ends.

6. In the combination of claim 2, said wear guard being a piece of tube.

7. In the combination of claim 1, said elongated flexible support having a second free end on the end opposite said first-mentioned free end insertable through an aperture in a bracket on a said glad hand, and said second free end includes second one-way means, said second one-way means having a leading end and a trailing end, a said elongated eye adjacent said second free end and its wedging portion being sized and structured to permit passage of said second one-way means through said last mentioned elongated eye, said trailing end of said second one-way means having an integral stop that is sized to provide a rigid abutment between said last mentioned elongated eye and said trailing end of said second one-way means, and said abutment restrains passage of said second one-way means in a direction toward said abutment between said last mentioned elongated eye and the integral stop, and a cable wear guard on the bight of said second free end.

8. A cable wear guard for shielding the bight in a cable from direct rubbing contact with a surface on which the bight of the cable would otherwise rub, comprising, a generally U-shaped member formed of a relatively rigid material and having an outwardly facing cable-receiving groove extending substantially from end-to-end in which the bight of a cable is free to slip, said groove being sufficiently closed adjacent its opposite ends whereby the bight of a cable is retained in said groove.

9. The cable wear guard of claim 8 wherein said groove therein sufficiently closed at at least one intermediate location to retain a cable in said groove at said location.

10. The cable wear guard of claim 9 wherein said intermediate location is approximately mid-way between said opposite ends.

11. In combination with a railway car having a car coupler and an air brake hose with a glad hand on its end, said coupler having a depending bracket with a transverse aperture therein for receiving a bight in a cable forming part of a support for the glad hand, a cable wear guard for shielding the bight in the cable from direct rubbing contact with the surface of said aperture, comprising, a generally U-shaped member formed of a rigid or relatively rigid material inserted in said aperture in a downwardly oriented position with its bight portion bearing down on the bottom surface of said aperture.

12. The combination of claim 11, said U-shaped member having an outwardly facing cable-receiving groove extending substantially from end-to-end in which the bight of a cable is free to slip, said groove being sufficiently closed adjacent its opposite ends whereby the bight of a cable is retained in said groove.

13. In the combination of claim 12 the cable wear guard called for therein having said groove therein sufficiently closed at at least one intermediate location to retain a cable in said groove at said location.

14. In the combination of claim 13 the cable wear guard called for therein having said intermediate location approximately mid-way between said opposite ends.

15. In the combination of claim 12 wherein said glad hand has a bracket with a second transverse aperture therein for receiving a bight in said cable, a second wear guard for shielding a second bight in said cable from direct rubbing contact with the surface of said second aperture comprising a second generally U-shaped member formed of a rigid or relatively rigid material inserted in said second aperture with its bight portion bearing upwardly on the upper surface of said second aperture, said second generally U-shaped member having an outwardly facing cable-receiving groove extending substantially from end to end in which said cable is secured.

* * * * *